May 13, 1952     K. G. MACLEISH     2,596,702
AUTOMATIC FOCUSING ARRANGEMENT
Filed June 1, 1951     2 SHEETS—SHEET 1
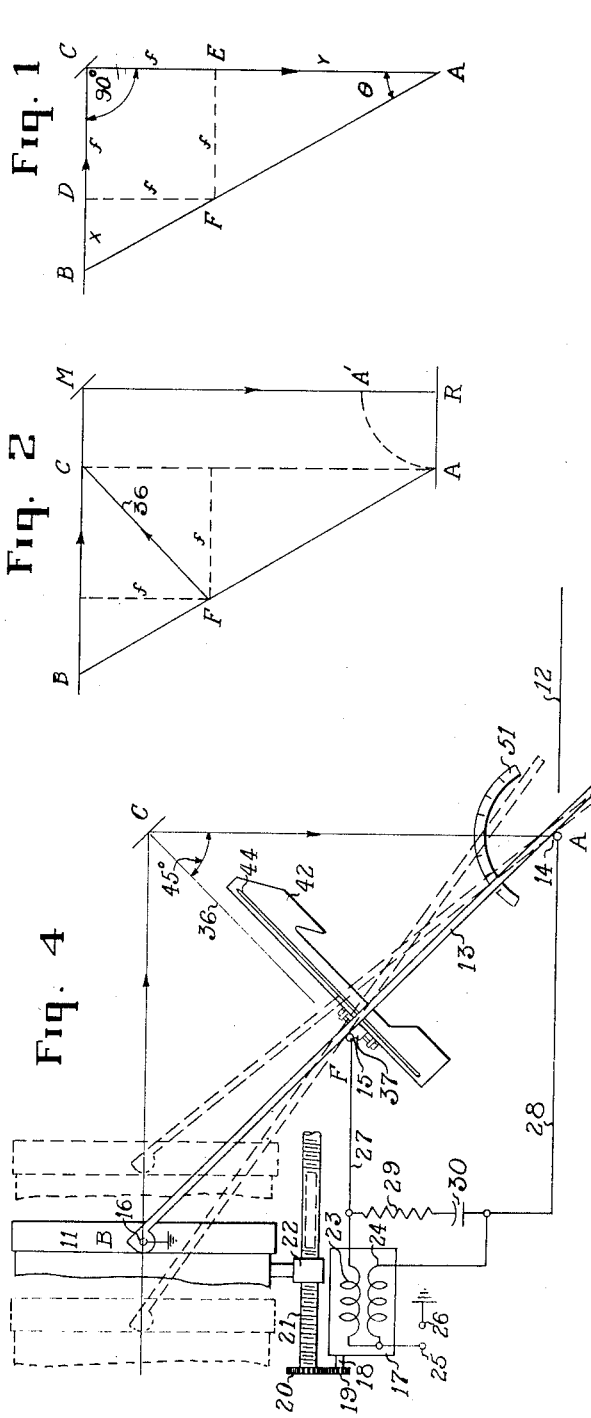
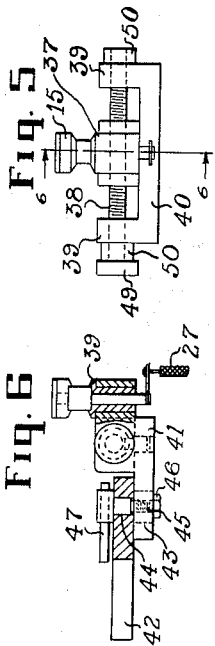
KENNETH G. MACLEISH
*INVENTOR.*
BY Daniel I. Mayne
J. Griffin Little
ATTORNEYS May 13, 1952 K. G. MACLEISH 2,596,702
AUTOMATIC FOCUSING ARRANGEMENT
Filed June 1, 1951 2 SHEETS—SHEET 2
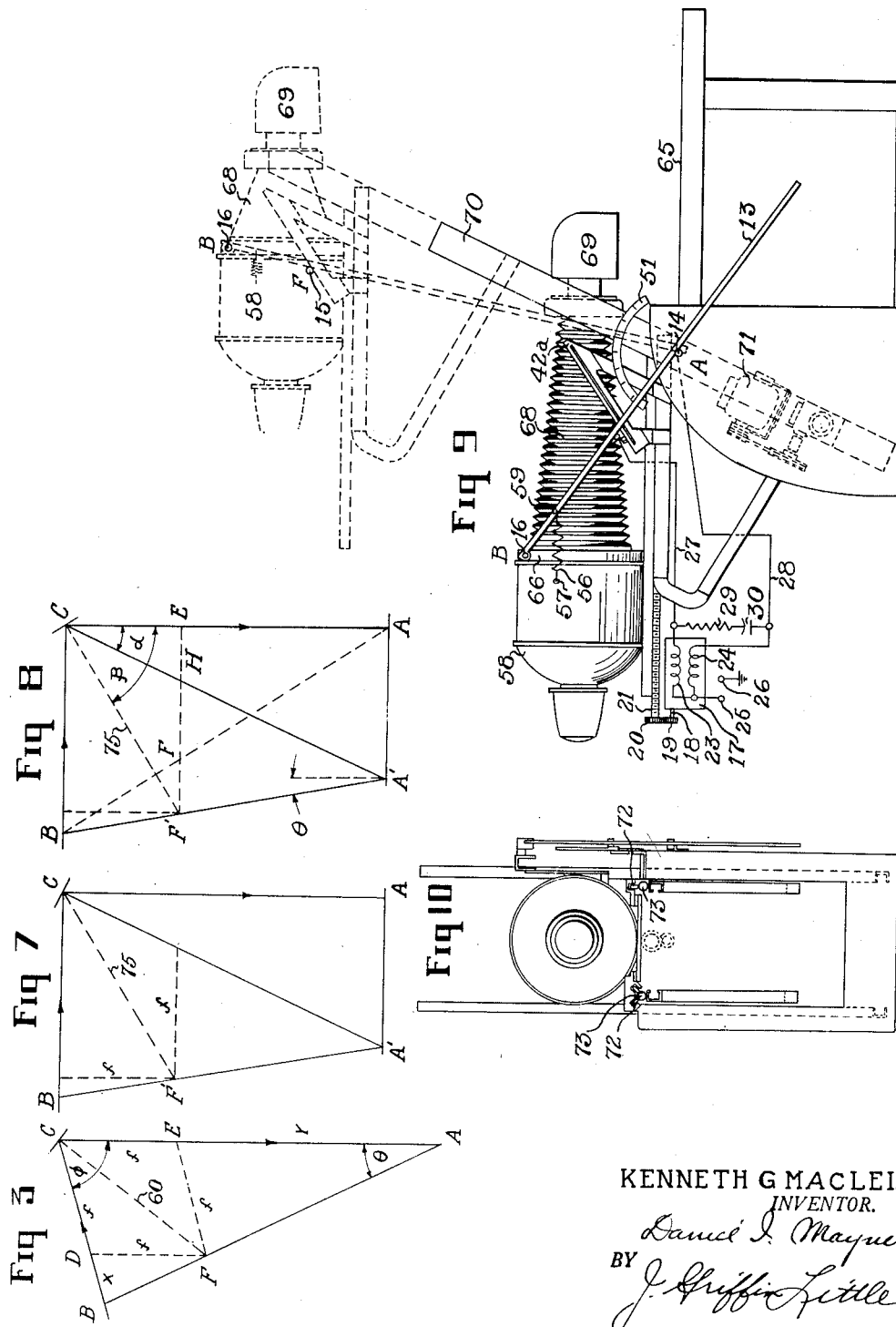
KENNETH G MACLEISH
INVENTOR.
BY
ATTORNEYS Patented May 13, 1952

2,596,702

UNITED STATES PATENT OFFICE 2,596,702

AUTOMATIC FOCUSING ARRANGEMENT

Kenneth G. Macleish, Rochester, N. Y., assignor to Eastman Kodak Company, Rochester, N. Y., a corporation of New Jersey Application June 1, 1951, Serial No. 229,434

20 Claims. (Cl. 88—24)

The present invention relates to photographic enlargers, and more particularly to a new and improved mechanism for positioning the enlarger parts to maintain the enlarger in focus automatically at all magnifications.

The mechanism of the present invention is adapted for use in an enlarger in which a lens and a reflector are used to reflect the light rays through a bent optical path to provide an optical axis having angularly arranged branches. As is well known, in order to maintain an enlarger in focus, the object member or negative and the image receiving member or easel must be positioned at conjugate points of the lens. In the modifications illustrated, the easel may be maintained fixed while the lens negative are moved as a unit relative to the easel to vary the magnification of the image on the easel. When the lens and negative are moved, the negative is also moved automatically relative to the lens along one branch of the optical axis to position the negative at such a point as to maintain the image in proper focus.

In order to secure the automatic adjustment of the negative, the present invention provides an electric motor for moving the negative relative to the lens and along one branch of the optical axis. To insure that the negative movement will be in the proper direction and the proper amount, the present invention provides a motor control in a form of three spaced contacts connected into the motor circuit and adapted to be connected by a straight bar when the parts are in focusing position. One such contact is fixed with relation to the easel, another contact is fixed with relation to the negative, while the third contact is fixed with relation to the particular focal length lens being used. When the negative and easel are at conjugate points, the contacts are in alignment and engaged by the bar so that the windings in the motor are balanced and the latter does not move. However, if the enlarger is out of focus, the contacts are not in alignment so that the bar will engage only two contacts, the particular contacts engaged depending upon the relative positions of the negative and the lens. When only two contacts are engaged by the bar, the motor circuits are unbalanced so that the motor will drive the negative to one of the conjugate points and will bring all the contacts into alignment so as to be engaged by the bar, at which time the motor stops and the parts are held in focusing relation. One of the contacts is adjustable to compensate for lenses of different focal lengths, but for any particular lens being used, the contact remains fixed relative thereto.

One object of the invention is the provision of a new and improved control mechanism for an enlarger.

Another object of the invention is the provision of a control mechanism which will position the parts automatically in proper relation to focus the image at all degrees of magnification.

A further object of the invention is the provision of a control mechanism which is adapted for use with lens of different focal lengths.

A still further object of the invention is the provision of a control mechanism which is simple in structure, comprises few parts of rugged construction, easy to operate, accurate and highly effective in use.

To these and other ends, the inventive idea resides in certain improvements and combinations of parts, all as will be hereinafter more fully described, the novel features being pointed out in the claims at the end of the specification.

In the drawings:

Fig. 1 is an illustration of the application of a theorem in geometric optics which gives the spatial relation between conjugate points of an optical system containing a right angle bend;

Fig. 2 is an illustration similar to Fig. 1 but showing the changes necessary when the separation of the lens and reflector is considered;

Fig. 3 is an illustration similar to Fig. 1 which gives the relation of the parts when the bend in the optical axis is less than a right angle;

Fig. 4 is an application of the principle of the theorem illustrated in Figs. 1 and 2 to an enlarger to control the spatial relation of the parts to maintain the enlarger in proper focus for all degrees of magnification;

Fig. 5 is a plan view of the adjustable intermediate contact point and the supporting bracket;

Fig. 6 is a sectional view taken substantially on line 6—6 of Fig. 5 showing the relation of the intermediate contact point bracket and its guide;

Fig. 7 is a view similar to Fig. 1 but showing the application of the theorem of geometric optics which gives the spatial relation of the conjugate points when an inclined track is used to move the lens and one of the members;

Fig. 8 is a modification of Fig. 7 which illustrates a method of proving the theorem of the spatial relation of the part;

Fig. 9 is a side elevation view of an enlarger having an inclined guide track showing the relation of the parts of the control members when the enlarger is in focus at two magnifications; and Fig. 10 is a front elevation view of the enlarger illustrated in Fig. 9, showing the relation of the contacts and the connecting bar to the enlarger.

Similar reference numerals throughout the various views indicate the same parts.

Fig. 1 of the drawings illustrates an old but rather obscure theorem in geometric optics that gives the spatial relation between the conjugate points of an optical system containing an angular bend, in the present instance a 90° bend, to provide an optical axis having normally arranged branches BC and CA. The lens and mirror are at C, while the negative or object member is at B, and the image receiving member or easel is at A. Of course, the location of the negative and easel are merely arbitrary, as it is apparent that the positions of these members may be reversed. The important point is that the negative and easel are on different branches of the optic axis and that the lens is at the apex of the angle between the branches. The mirror arrangement which bends the light path will be assumed, for the moment, to coincide with the lens at C. Points A and B are two points on the optical axis. Point F, to be later more fully described, is one focal length distance from each branch BC and CA of the optic axis. The theorem states that if points A, B and F are collinear, A and B are conjugate to each other with respect to the lens, and the enlarger is at focus. The proof follows from the fact that the triangles BDF and FEA are similar; hence $x/f$ equals $f/y$, which is the Newtonian expression for conjugate distances measured from the focal points.

In an actual system, of course, the mirror cannot coincide with the lens, nor can the position of the lens be represented by a single point C, as in Fig. 1. The theorem is easily modified to take these facts into account. If, for example, the mirror is at M the second conjugate point A obviously has been moved closer to the line BM to point A', the distance RA' equals CM. If the lens is thick point C may be taken to be the first principal point of the lens; then the second conjugate point is displaced downward from A' by a constant distance equal to the separation of the principal points. Moreover, point C may be displaced any distance from the actual lens, merely by moving the other points of Fig. 2 away from the corresponding optical elements by a like distance. For simplicity in the description that follows, these facts will be taken for granted and the lens and the mirror will be represented by a single point C.

A straight forward method of applying the theorem to an enlarger is to make the points B and A, Fig. 4, correspond with the center of the negative 11 and the center of the easel 12 respectively. Line AB is represented by a rigid bar 13 constrained to pass through points A, B and F. If the easel is moved up and down to change magnification, the rigid bar 13 moves the negative holder in such a way as to maintain focus. The difficulty of this system is that the mechanical advantage becomes prohibitively low at magnifications much less than unity. Friction and inertia in the negative carrier set a definite lower limit to the magnification than can be used.

In order to overcome these disadvantages, in the present invention the negative carrier is not actuated by the bar, but rather by an electric motor. The direction of motor rotation is controlled by the manner in which the bar 13 rests on one or both of two pins or contacts 14 and 15 placed at points A and F respectively. Another pin or contact 16 is placed at point B. The motor 17 has a shaft 18 on which is mounted a gear 19 which meshes with a gear 20 carried by a threaded member 21 which engages a depending threaded block 22 carried by the negative carrier. Thus, when the motor 17 is rotated in either direction, the negative carrier will be moved along the branch BC of the optic axis to move the negative 11 relative to the lens and mirror.

In the preferred form, the motor 17 is of the two-phase squirrel-cage type having two windings 23 and 24, each having one side thereof connected to one side 25 of an A. C. main, the other side 26 of which is grounded. The bar 13, which is of metal and electrically grounded through contact 16, has its upper end pivoted on contact 16 which is placed at the point represented by point B, Figs. 1 and 2. The contacts 14 and 15 are placed at points A and F, respectively, and are insulated from the ground and connected to windings 24 and 23, respectively by wires 28 and 27, as shown in Fig. 4. Thus, contacts 14 and 15 are connected into separate circuits of the motor 17. A resistance 29 and a capacity 30 are arranged in series and shunted across the two circuits, as clearly shown in Fig. 4. The pivot of the bar 13 at 16 is displaced from the lower edge of the bar by a distance equal to the radius of contacts 14 and 15.

According to the theorem stated above, the system is in focus when the bar 13 rests simultaneously on and connects contacts 14, 15, and 16, as shown in the solid lines of Fig. 4. In this condition the two windings 23 and 24 are equally energized. Since there is no phase displacement between the windings, the motor does not drive the negative carrier, and the system remains in focus with the negative and easel at the conjugate points of the lens and with the image in focus.

Suppose now that the system is not in focus, and the negative carrier is at the rightward position shown by the dotted lines in Fig. 4. Then, the bar 13 will be lifted off contact 15 but will engage contact 14, and the windings 23 and 24 will be unequally energized. The circuit to pin 14 will be from point 25 through winding 24, wire 28, contact 14, bar 13, contact 16 to ground. On the other hand, the circuit through winding 23 will be from point 25, winding 23, resistance 29, capacity 30, to wire 28, contact 14, bar 13, contact 16 and ground. Thus, the two circuits are unequally energized causing a phase difference therebetween. This resulting phase difference will cause the motor 17 to rotate to drive the negative carrier to the left to the solid position shown in Fig. 4 to bring the contacts 14, 15 and 16 into alignment and into engagement with bar 13 at which time the two windings 23 and 24 are again balanced and the motor stops with the negative carrier at the conjugate point of the lens so that the image will be in focus. If, however, the negative were moved to the leftward position shown dotted in Fig. 4, the bar 13 will be lifted off contact 14 but will engage contact 15, and the phase situation of the windings would be reversed. The circuit through winding 23 would then be from point 25, winding 23, through wire 27, pin 15, bar 13, pin 16 to ground, while the circuit through winding 24 would be from point 25, winding 24, capacity 30, resistance 29, wire 27, contact 15, bar 13, contact 16 to ground. This condition of the windings would cause the motor to shift the negative carrier to the right and to its central position such that the contacts 14, 15 and 16 are in alignment as the negative carrier is positioned at its proper conjugate point and the image will be in focus. Thus, whenever the system is out of focus the phase relation of the windings 23 and 24 is such as to cause the motor to drive the negative carrier in the proper direction. However, when the negative and easel are at the conjugate point of the lens and the enlarger is in focus, the bar 13 engages the aligned contacts 14, 15 and 16 and the windings 23 and 24 are again in balance and the motor stops. The polarity of the connections is made such that the system always moves towards focus. The resistance 29 is needed only to eliminate sparking at the contacts due to a sudden discharging of the capacitor 30.

By proper selection of the speed-torque characteristics of the motor 17, the system can be made dynamically stable; i. e. it will come to rest at the focus point after one or a small number of oscillations. The process is facilitated by the provision of a small "dead space" or finite interval in which the motor does not drive. Sufficient "dead space" is readily obtained through an inevitable flexure of the bar 13 and a slight looseness at contact 16. The mechanism works equally well in an arrangement where the easel is held stationary while the lens and mirror are moved vertically. In this connection the negative carrier travels on horizontal guides which move up and down in fixed relation to the lens. This type of operation is identical with that of Fig. 4, except for a change in the frame of reference. In any case, point F is fixed with respect to the particular focal length lens being used, point B is fixed with respect to the negative, and point A is fixed with respect to the easel. As the particular guides for the parts may be of any suitable and well known construction and do not form a part of the present invention, such structures are now shown or described.

The contact 15 corresponding to point F, Fig. 1, is fixed with relation to the focal length lens being used. However, it is sometimes desirable to use lenses of different focal length. With such a change in the lens, obviously the position of the contact 15 or point F must be varied to suit the particular focal length of the lens being used. Once the change has been made, the relation of the contact 15 and the lens remains fixed until a further lens change is made, but with each lens there is a definite fixed relation to the contact 15 and the lens C. Therefore, in order to accommodate lenses of different focal lengths, the present invention provides an arrangement by which the position of pin or contact 15 may be adjusted relative to the lens. Any focal length lens can be accommodated by an adjustment of pin 15 or point F along a 45° line 36 connecting the point F to the lens C, see Figs. 2 and 4.

To secure this result, the contact point 15 is carried on the thread block 37 which engages with a threaded member 38 carried in spaced bearings 39 of a channel-shaped bracket 40. The latter is also formed with a depending plate or skirt portion 41 which overlies a bracket guide 42 carried by the supporting structure of the enlarger. The plate portion 41 is provided with a pair of elongated slots 43 which overlie a slot 44 in the bracket guide 42 as best shown in Fig. 6. The bolts 45 extend through the registering slots 43 and 44 and each bolt has a nut 46 secured to one end thereof, while the other end has a clamping member formed with a handle 47. Thus, by turning the handle 47, the bolts may be released and the bracket 40 slid along the guide 42 toward or away from the lens along the line 36 until the approximate adjustment is reached. Fine adjustment may be obtained by adjusting the member 37 by rotating member 38 by means of a gripping member 49. Member 38 is held in place by collars 50. After the adjustment is made, handles 47 are then turned so that bolts 45 clamp plate 41 tightly to bracket guide 42. A simple adjustment procedure is to set each element A, B and C for sharp focus at different magnifications. Contact 15 is adjusted at unit magnification, contact 14 at low magnification and contact 16 at high magnification. Since the adjustments interact slightly, the cycle of adjustment is repeated until sharp focus is obtained at all three magnifications.

In equilibrium the slope of the bar 13 depends only on the magnification and is independent of the focal length of the lens. This is evident from Fig. 1 in which the magnification$=AC/BC=$cotangent $\theta$. The magnification can then be read directly from a suitable scale 51 at A, B or F, and a pointer, not shown, which turns with the bar 13. In the illustration, the scale 51 is shown at point A. A single such magnification scale serves for all lenses.

The point on which the bar 13 turns may be alternatively located at point A (contact 14) instead of at point B (contact 16). In this case the contact pins connected to windings 23 and 24 will be located at B and F instead of A and F, as shown in Fig. 4. The electrical and mechanical features so far described can be applied similarly to the arrangement illustrated in Fig. 3; and also that illustrated in Figs. 7 and 8 and embodied in the enlarger illustrated at Figs. 9 and 10. The designations that follow will, therefore, be limited mainly to the geometry of these arrangements.

Fig. 3 shows an optical system similar to that of Fig. 1 except that the angle $\Phi$ between the two branches of the optical axis is not necessarily a right angle. Point F is one corner of a parallelogram whose sides CD and CE are each equal to one focal length of the lens. Any pair of points A and B that are collinear with F are conjugate to each other. As the triangles BDF and FEA are similar, therefore, $x/f=f/y$. This system is indeterminate when $\Phi$ is either zero or 180°. Various focal length lenses are accommodated by an adjustment of point F along a straight line 60 bisecting angle $\Phi$. It is easily shown that the magnification is determined by the slope angle $\theta$ of line AB. By the law of sines the magnification equals $AC/BC=$sine $(\theta+\Phi)$ sine $\theta$.

In one arrangement, the easel is stationary and horizontal, and the lens and mirror travel in a vertical line, and the negative carrier and lamphouse operate on a horizontal track to move up and down with the lens. As the separate structures do not form a part of the invention they are not described or illustrated. However, if the easel is large and the lamphouse is heavy, bracing is required under the structure overhanging the easel. The bracing members may interfere with the operator's access to the easel at low magnifications. The customary solution of this difficulty is to make the lens move in an inclined rather than a vertical path so that it is over the center of the easel only at high magnifications. The required bracing can be behind and below the working area at all times. However, for the purposes of simplicity, and the fact that such arrangements are old, they are not illustrated or described.

With this last arrangement, the geometry of Fig. 1 still applies; but point A, since it is on the optic axis below the lens, is required to be moved horizontally on the easel as the magnification is varied. The more general system shown in Fig. 7 avoids this difficulty. In Fig. 7 point A' is a fixed point on a stationary easel. The lens and mirror at C move along the inclined path A'C. The negative at B is kept at the same vertical level as C, but allowed to move horizontally with respect to C. Point F' is fixed with respect to C at a position one focal length down from line BC and one focal length to the left of line A'C. It will be shown that when points A', B and F' are collinear, the image is in focus on the easel.

To prove this, draw a line AB (Fig. 8) intersecting the easel at the point A on the optic axis, and draw a horizontal line through F' intersecting line AB at F, line A'C at H and line AC at E. Triangles ABC and A'BC have a common base BC and a common altitude AC. The line segments F'H and FE are cut by these triangles from the common line F'E parallel to the base BC. Therefore, by a theorem in plane geometry, F'H=FE. By assumption F'H is equal to the focal length, hence FE is also one focal length. Therefore point F is identical with point F in Fig. 1. Since F is collinear with A and B, the system is in focus by the theorem.

In Figs. 7 and 8, like Fig. 1, it is assumed that both lens and mirror are at C. As mentioned above, in actual practice the lens and mirror are separated, as described in connection with Fig. 2. Therefore, if in Figs. 7 and 8 the mirror is separated from the lens by the distance CM (Fig. 2), then point A' must be vertically downward an equal distance, and the point A' will, therefore, be below the line A'A, Figs. 7 and 8. It has been found, however, in actual practice that if the upper end of the bar 13 is pivoted at B, the lower end of the bar would strike the floor at intermediate magnifications. In order to overcome this difficulty, the pivot point of the bar 13 is moved vertically above the pivot point B to a point B', see Fig. 9. Because point B has been moved upward to B', it is necessary to move points F' and A' upward equal amounts, with the result that A' is returned substantially to the plane of the easel.

Figs. 9 and 10 illustrate parts of the mechanism embodying the principle illustrated in Figs. 7 and 8 and above described. In this embodiment the easel 65 is stationary and the negative carrier and lens move upward or downward relative to the easel to vary magnification. The lamphouse 58 forms a unitary structure with the negative carrier 66 which is connected by a bellows 68 to the lens and mirror combination 69, all of which elements move upward or downward along an inclined tract 70. Such movements may be performed manually, or the parts may be moved by an electric motor 71. The particular enlarger shown is not intended as a limitation, but merely as one type adapted for use with the control mechanism of the present invention. It will be noted, and is also apparent to those familiar with such enlargers, that as the negative carrier and lens assembly are moved upward, it is necessary also to move the negative carrier horizontally toward or away from the lens so as to maintain the image in focus on the easel, the bellows 68 expanding or collapsing to permit such movement. In order to allow freedom of movement, the negative and supporting frame of the carrier and lens lamphouse are provided with rollers 72 which engage spaced tracks 73 which move vertically as a unit with the lamphouse, negative carrier and lens assembly, as is apparent from Fig. 9. Thus, the lens, negative carrier and lamphouse move vertically as a unit; and in addition the negative carrier and lamphouse move horizontally relative to the lens to maintain the image in focus.

As will be remembered from the above description, when the image is in focus the negative carrier and easel are at conjugate points of the lens. Also as mentioned above, when the image is in focus, the contact points 14, 15 and 16, which are positioned at points A', F' and B', are in alignment and are engaged by the bar 13, and the windings 23 and 24 are energized equally and the parts remain stationary and the image is held in focus on the easel. However, if the image is out of focus, the negative carrier is moved to the right or left of its conjugate point, as illustrated in Fig. 4, and the bar 13 is lifted off one of the points 14 or 15, as illustrated in Fig. 4. The particular control point which is disconnected from the bar depends, of course, on the position of the negative carrier relative to the lens. As mentioned above, when the bar is lifted off one of the contacts, windings 23 and 24 are unbalanced, and the motor will then drive the negative carrier in the proper direction and amount to return the carrier to its conjugate point. At that time the contacts will be in alignment and will be engaged by the bar so that the windings will be energized equally, the motor will stop and the parts will be in focusing arrangement. Thus, the embodiment of Fig. 9 like that of Fig. 4 utilizes the pivoted bar 13 and the three contact points 14, 15 and 16 to control the operation of the motor to bring the negative to the conjugate point of the lens for any position of the latter relative to the easel. In the embodiment illustrated in Fig. 9, the bar 13 must rotate past a vertical position so that its weight alone no longer supplies the required contact pressure, as in the modification illustrated in Fig. 4. It will be evident, however, that the necessary torque about the point 16 can be obtained equally well from a suitable spring 56 having one end 57 fixed to a suitable member, such as a lamphouse 58, and the other end 59 attached to bar 13.

In the embodiment shown in Figs. 9 and 10, different focal length lenses may be used by merely adjusting the point F' along the straight line 75 connecting F' and C, as shown in Figs. 7 and 8. With the arrangement shown, tangent $\beta = 1 + $ tangent $\alpha$, where $\alpha$ is the slope angle of the inclined track 70. It is apparent that if the position of the inclined track, which is represented by line A'C, Figs. 7 and 8, were moved to coincide with the line CA, the tangent of the angle $\alpha$ would be zero and the above equation would then read tangent $\beta = 1$, and $\beta$ would be 45°, which is the arrangement illustrated in Fig. 1. The slope angle $\theta$ of bar 13 depends, as before, only on magnification. This angle, therefore, can be made to serve as the magnification indicator. An analysis shows that the magnification is equal to $$AC/BC = \frac{\cos \theta \cos \alpha}{\sin (\theta + \alpha)} = \frac{1}{\tan \theta + \tan \alpha}$$

In order that the contact 15, Fig. 9, may be moved along the line F'C, Figs. 7 and 8, to compensate for lenses of different focal lengths, the contact 15 is mounted, in the manner above described, and the parts in Fig. 9 correspond to those in Figs. 4, 5 and 6 are designated by the same numerals. However, as the contact 15 moves along the line 75, which is not 45° as in Fig. 4, the bracket guide 42a of Fig. 9 is not at 45° but rather at angle β, see Figs. 7 and 8. Otherwise the structures of Figs. 4 and 9 are the same and operate in the same manner. In Fig. 9 the mechanism is shown in focus at two different magnifications. It will be apparent that when the lens and negative carrier are moved to their upper position, the weight of the bar 13 will not be sufficient to hold the bar in engagement with the points 14 and 15, as in Fig. 4. For this reason, the spring 58 is utilized to insure correct cooperation of the bar 13 with contact points 14 and 15, especially when the negative carrier and the lens are in their upper positions.

Thus, in both embodiments described above, whenever the image is in focus, the negative and easel are positioned at the conjugate points of the lens. Also, when this position is reached the contacts 14, 15 and 16 are in alignment and are all engaged by the bar 13 to stop the motor 17. However, if the image is out of focus, one of the contacts 14 or 15 is not engaged by the bar 13, and this relation will serve to unbalance the windings 23 and 24 of the motor 17, and the latter will become operative to move the negative carrier to bring the negative back to the conjugate point, and again to position the contacts 14, 15 and 16 in alignment so as to be engaged by the bar. At this time the motor stops and the parts are held in proper relation to maintain the image in focus on the easel. The control mechanism of the present invention is simple, rugged, easy to operate, accurate, and highly effective in use.

While certain embodiments of this invention have been disclosed, it is to be understood that the inventive idea may be carried out in a number of ways. This application is not, therefore to be limited to the precise details disclosed, but is intended to cover all variations and modifications falling within the scope of the appended claims.

What I claim and desire to secure by Letters Patent of the United States is:

1. In a photographic enlarger, the combination with a projector lens and a reflector for reflecting light rays through a bent optical path to provide an optical axis having angularly arranged branches, object and image receiving members positioned on different branches and located at conjugate points of said lens when said enlarger is in focus, said lens and one of said members being movable along separate paths and relative to the other member to vary the magnification of the image, of an electrical contact fixed with respect to the image receiving member, a second contact fixed with respect to the object member, a third contact fixed relative to said lens and positioned intermediate said other contacts, said third contact being spaced a distance of one focal length from said lens path measured parallel to the nearer branch of said axis, said contacts being arranged in alignment when said enlarger is in focus and said members are at said points, an electrical motor, means for connecting said motor to said movable member to move the latter along one of said branches and relative to said lens, means for connecting said contacts into the circuit of said motor, a straight bar, and means to pivot said bar on one of said contacts, said bar pivoting on said one contact and movable into engagement with the other two contacts when the contacts are aligned and said enlarger is in focus, but when the contacts are out of alignment the bar will engage only one of the other contacts to adjust the circuit of said motor to cause said motor to move said movable member relative to said lens to a conjugate point thereof to bring the enlarger into focus.

2. In a photographic enlarger, the combination with a projection lens and a reflector for reflecting light rays through an optical path of 90° to provide an optical axis having normally arranged branches, object and image receiving members positioned on different branches and located at conjugate points of said lens when said enlarger is in focus, said lens and one of said members being movable along separate paths and relative to the other member to vary the magnification of the images, of an electrical contact fixed with respect to said image receiving member, a second contact fixed with respect to the object member, a third contact fixed relative to said lens and positioned intermediate said other contacts, said third contact being spaced a distance of one focal length from said lens path measured parallel to the nearer branch of said axis, said contacts being arranged in alignment when said enlarger is in focus and said members are at said points, an electrical motor, means for connecting said motor to said movable member to move the latter along one of said branches and relative to said lens, means for connecting said contacts into the circuit of said motor, a straight bar, and means to pivot said bar on one of said contacts, said bar pivoting on said one contact and movable into engagement with the other two contacts when the contacts are aligned, but when the contacts are out of alignment the bar will engage only one of the other contacts to adjust the circuit of said motor to cause said motor to move said movable member relative to said lens to a conjugate point thereof to bring the enlarger into focus.

3. In a photographic enlarger, the combination with a projector lens and a reflector for reflecting light rays through a bent optical path to provide an optical axis having angularly arranged branches, object and image receiving members positioned on different branches and located at conjugate points of said lens when said enlarger is in focus, said lens and one of said members being movable along separate paths and relative to the other member to vary the magnification of the image, of an electrical contact fixed with respect to the image receiving member, a second contact fixed with respect to the object member, a third contact fixed relative to said lens and positioned intermediate said other contacts, said third contact being spaced a distance of one focal length from said lens path measured parallel to the nearer branch of said axis, said contacts being arranged in alignment when said enlarger is in focus and said members are at said points, an electrical motor, means for connecting said motor to said movable member to move the latter along one of said branches and relative to said lens, means for connecting said contacts into the circuit of said motor, a straight bar, and means to pivot said bar on one of said contacts, said bar pivoting on said one contact and movable into engagement with the other two contacts when the contacts are aligned, and said enlarger is in focus, but when the contacts are out of alignment the bar will engage only one of the other contacts to adjust the circuit of said motor to cause said motor to move said movable member relative to said lens to a conjugate point thereof to bring the enlarger into focus, when said movable member has been moved to said point and said contacts brought into alignment said bar will engage all contacts and the motor will stop to retain said enlarger in focus.

4. In a photographic enlarger, the combination with a projector lens and a reflector for reflecting light rays through a bent optical path to provide an optical axis having angularly arranged branches, object and image receiving members positioned on different branches and located at conjugate points of said lens when said enlarger is in focus, said lens and one of said members being movable along separate paths and relative to the other member to vary the magnification of the image, of an electrical contact fixed with respect to the image receiving member, a second contact fixed with respect to the object member, a third contact fixed relative to said lens and positioned intermediate said other contacts, said third contact being spaced a distance of one focal length from said lens path measured parallel to the nearer branch of said axis, said contacts being arranged in alignment when said enlarger is in focus and said members are at said points, an electrical motor, means for connecting said motor to said movable member to move the latter along one of said branches and relative to said lens, two electrical circuits in said motor, means for connecting two of said contacts separately into said circuits, means for connecting the other contact into both of said circuits, a straight bar, and means to pivotally connect said bar on said other contact, said bar pivoting on said other contact and engaging both of said two contacts when said enlarger is in focus, and said members are at said points to balance said circuits of said motor to stop the latter to retain said members at said points and said enlarger in focus, the movement of said movable member away from its conjugate point serving automatically to pivot said bar to move the latter out of contact with one of said two contacts to unbalance said circuits to cause the motor to move said movable member to bring the latter back to its conjugate point.

5. In a photographic enlarger, the combination with a projector lens and a reflector for reflecting light rays through a bent optical path to provide an optical axis having angularly arranged branches, object and image receiving members positioned on different branches and located at conjugate points of said lens when said enlarger is in focus, said lens and one of said members being movable along separate paths and relative to the other member to vary the magnification of the image, of an electrical contact fixed with respect to the object member, a third contact fixed relative to said lens and positioned intermediate said other contacts, said third contact being spaced a distance of one focal length from said lens path measured parallel to the nearer branch of said axis, said contacts being arranged in alignment when said enlarger is in focus and said members are at said points, an electrical motor, means for connecting said motor to said movable member to move the latter along one of said branches and relative to said lens, two electrical circuits in said motor, means for connecting two of said contacts separately into said circuits, means for connecting the other contact into both of said circuits, a straight bar, means to pivotally connect said bar on said other contact, said bar pivoting on said other contact and engaging both of said two contacts when said enlarger is in focus and said members are at said points, said circuits being in balance when said bar engages all of said contacts to stop said motor to retain said members at said points, and means to unbalance said circuits when said bar engages only one of said two contacts to cause said motor to drive said movable member to shift the latter relative to said lens and to one of said points to bring said contacts in alignment and to focus the enlarger.

6. In a photographic enlarger, the combination with a projector lens and a reflector for reflecting light rays through a bent optical path to provide an optical axis having angularly arranged branches, object and image receiving members positioned on different branches and located at conjugate points of said lens when said enlarger is in focus, said lens and one of said members being movable along separate paths and relative to the other member to vary the magnification of the image, of an electrical contact fixed with respect to the image receiving member, a second contact fixed with respect to the object member, a third contact fixed relative to said lens and positioned intermediate said other contacts, said third contact being spaced a distance of one focal length from said lens path measured parallel to the nearer branch of said axis, said contacts being arranged in alignment when said enlarger is in focus and said members are at said points, an electrical motor, means for connecting said motor to said movable member to move the latter along one of said branches and relative to said lens, one side of said motor being grounded, a straight bar, means to pivot said bar on one of said contacts, said one contact being grounded to ground said bar, two electrical circuits in said motor, means for connecting one of the other contacts into one of said circuits, means to connect the remaining contact into the other circuit, and unbalancing means connecting said circuits, said bar pivoting on said one contact to engage the other two contacts to complete both circuits and cut out said unbalancing means to stop said motor when all of said contacts are in alignment and engaged by said bar and said enlarger is in focus, but when said enlarger is out of focus said contacts will be moved out of alignment so that said bar will contact only one of said two contacts to cut in said unbalancing means to unbalance said circuit to cause said motor to operate to shift said movable member relative to said lens to bring said contacts back again into alignment and to position said member at said points to focus the enlarger.

7. In a photographic enlarger, the combination with a projector lens and a reflector for reflecting light rays through a bent optical path to provide an optical axis having angularly arranged branches, object and image receiving members positioned on different branches and located at conjugate points of said lens when said enlarger is in focus, said lens and one of said members being movable along separate paths and relative to the other member to vary the magnification of the image, of an electrical contact fixed with respect to the image receiving member, a second contact fixed with respect to the object member, a third contact fixed relative to said lens and positioned intermediate said other contacts, said third contact being spaced a distance of one focal length from said lens path measured parallel to the nearer branch of said axis, said contacts being arranged in alignment when said enlarger is in focus and said members are at said points, an electrical motor, means for connecting said motor to said movable member to move the latter along one of said branches and relative to said lens, one side of said motor being grounded, a straight bar, means to pivot said bar on one of said contacts, said one contact being grounded to ground said bar, two electrical circuits in said motor, means for connecting one of the other contacts into one of said circuits, means to connect the remaining contact into the other circuit, and unbalancing means connecting said circuits, said bar pivoting on said one contact to engage the other two contacts to complete both circuits and cut out said unbalancing means to stop said motor when all of said contacts are in alignment and engaged by said bar and said enlarger is in focus, but when said enlarger is out of focus said contacts will be moved out of alignment so that said bar will contact only one of said two contacts to connect said engaged contact directly with one of said circuits and indirectly with the other circuit through said unbalancing means to unbalance said circuits to cause said motor to operate to drive said movable member along its branch relative to said lens to bring all of said contacts back into alignment and into engagement with said bar to balance said circuits and stop said motor to focus the enlarger with said members at said points.

8. In a photographic enlarger, the combination with a projector lens and a reflector for reflecting light rays through a bent optical path to provide an optical axis having angularly arranged branches, object and image receiving members positioned on different branches and located at conjugate points of said lens when said enlarger is in focus, said lens and one of said members being movable along separate paths and relative to the other member to vary the magnification of the image, of an electrical contact fixed with respect to the image receiving member, a second contact fixed with respect to the object member, a third contact fixed relative to said lens and positioned intermediate said other contacts, said third contact being spaced a distance of one focal length from said lens path measured parallel to the nearer branch of said axis, said contacts being arranged in alignment with said enlarger is in focus and said members are at said points, an electrical motor, means for connecting said motor to said movable member to move the latter along one of said branches and relative to said lens, means for connecting said contacts into the circuit of said motor, a straight bar, means to pivot said bar on one of said contacts, said bar pivoting on said one contact and movable into engagement with the other two contacts when the contacts are aligned and said enlarger is in focus, but when the contacts are out of alignment the bar will engage only one of the other contacts to adjust the circuit of said motor to cause said motor to move said movable member relative to said lens to a conjugate point thereof to bring the enlarger into focus, and means for varying the position of said third contact relative to the other contacts to compensate for lenses of different focal lengths.

9. In a photographic enlarger, the combination with a projector lens and a reflector for reflecting light rays through a bent optical path to provide an optical axis having angularly arranged branches, object and image receiving members positioned on different branches and located at conjugate points of said lens when said enlarger is in focus, said lens and one of said members being movable along separate paths and relative to the other member to vary the magnification of the image, of an electrical contact fixed with respect to the image receiving member, a second contact fixed with respect to the object member, a third contact fixed relative to said lens and positioned intermediate said other contacts, said third contact being spaced a distance of one focal length from said lens path measured parallel to the nearer branch of said axis, said contacts being arranged in alignment when said enlarger is in focus and said members are at said points, an electrical motor, means for connecting said motor to said movable member to move the latter along one of said branches and relative to said lens, means for connecting said contacts into the circuit of said motor, a straight bar, means to pivot said bar on one of said contacts, said bar pivoting on said one contact and movable into engagement with the other two contacts when the contacts are aligned and said enlarger is in focus, but when the contacts are out of alignment the bar will engage only one of the other contacts to adjust the circuit of said motor to cause said motor to move said movable member relative to said lens to a conjugate point thereof to bring the enlarger into focus, an adjustable mounting for said third contact, the latter being movable on said mounting along a line connecting the third contact and lens to position said third contact to compensate for lenses of different focal length, and means for clamping said third contact in a fixed relation to said lens.

10. In a photographic enlarger, the combination with a projector lens and a reflector for reflecting light rays through a bent optical path to provide an optical axis having angularly arranged branches, object and image receiving members positioned on different branches and located at conjugate points of said lens when said enlarger is in focus, said lens and one of said members being movable along separate paths and relative to the other member to vary the magnification of the image, of an electrical contact fixed with respect to the image receiving member, a second contact fixed with respect to the object member, a third contact fixed relative to said lens and positioned intermediate said other contacts, said third contact being spaced a distance of one focal length from said lens path measured parallel to the nearer branch of said axis, said contacts being arranged in alignment when said enlarger is in focus and said members are at said points, an electrical motor, means for connecting said motor to said movable member to move the latter along one of said branches and relative to said lens, one side of said motor being grounded, a straight bar, means to pivot said bar on one of said contacts, said one contact being grounded to ground said bar, two electrical circuits in said motor, means for connecting one of the other contacts into one of said circuits, means to connect the remaining contact into the other circuit, unbalancing means connecting said circuits, said bar pivoting on said one contact to engage the other two contacts to complete both circuits and cut out said unbalancing means to stop said motor when all of said contacts are in alignment and engaged by said bar and said enlarger is in focus, but when said enlarger is out of focus said contacts will be moved out of alignment so that said bar will contact only one of said two contacts to connect said engaged contact directly with one of said circuits and indirectly with the other circuit through said unbalancing means to unbalance said circuits to cause said motor to operate to drive said movable member along its branch relative to said lens to bring all of said contacts back into alignment and into engagement with said bar to balance said circuits and stop said motor to focus the enlarger with said members at said points, an adjustable mounting for said third contact, the latter being positionable on said mounting along a line connecting said third contact and said lens to adjust said third contact along said line to compensate for lenses of different focal length, and means to clamp said third contact in position on said mounting.

11. In a photographic enlarger, the combination with a projection lens and a reflector for reflecting light rays through a bent optical path to provide an optical axis having angularly arranged branches, object and image receiving members positioned on different branches and located at the conjugate points of said lens when said enlarger is in focus, said lens and one of said members being movable along separate paths relative to the other member, of a pair of electrical contacts positioned on said branches and in the planes of said members, another contact positioned intermediate and in alignment with said pair of contacts when said members are at said points and said enlarger is in focus, said other contact being spaced from each branch a distance equal to the focal length of said lens, an electrical motor, means to connect said motor to one of said members to move the latter along its branch toward one of said points, means for connecting said contacts in the circuit of said motor, and a straight bar pivoted at one of said contacts and engaging and electrically connecting said aligned contacts when said enlarger is in focus to stop said motor, but when said enlarger is out of focus said contacts are misaligned so that said bar will engage only one of said two contacts to actuate said motor to move said one member toward one of said points to focus the enlarger and to realign said contacts.

12. In a photographic enlarger, the combination with a projection lens and a reflector for reflecting light rays through a bent optical path to provide an optical axis having angularly arranged branches, object and image receiving members positioned on different branches and located at the conjugate points of said lens when said enlarger is in focus, said lens and said object member being movable relative to said image receiving member to vary the magnification, said lens moving along one of said branches, of a pair of electrical contacts arranged in fixed position in the planes of said members and on said branches, a third contact positioned between and in alignment with said two contacts when said enlarger is in focus and said members are at said points, said third contact being spaced a distance of one focal length of the lens from each branch, an electrical motor, means to connect said motor to said object member to move the latter along the other branch relative to said lens and toward one of said points, two circuits in said motor, means to connect said contacts into said circuits, and a straight bar engaging and electrically connecting said aligned contacts when said members are at said points to control said circuits to stop said motor to retain said members in focus, the movement of said object member away from its point serving to move said bar out of engagement with one of said contacts to unbalance said circuits to actuate said motor to move said object member toward its point to bring the enlarger into focus and to align said contacts to stop said motor to hold the adjustment of said members.

13. In a photographic enlarger, the combination with a projection lens and a reflector for reflecting light rays through a bent optical path to provide an optical axis having angularly arranged branches, object and image receiving members positioned on different branches and located at the conjugate points of said lens when said enlarger is in focus, said lens and said object member being movable relative to said image receiving member to vary the magnification, said lens moving along one of said branches, of a pair of electrical contacts arranged in fixed position in the planes of said members and on said branches, a third contact positioned between and in alignment with said two contacts when said enlarger is in focus and said members are at said points, said third contact being spaced a distance of one focal length of the lens from each branch, an electrical motor, means to connect said motor to said object member to move the latter along the other branch relative to said lens and toward one of said points, two circuits in said motor, means to connect said contacts into said circuits, and a straight bar engaging and electrically connecting said aligned contacts when said members are at said points to control said circuits to stop said motor to retain said members in focus, and an unbalancing means shunted across said circuits, the moving of said object member away from its point serving to move said bar out of engagement with one of said contacts to position said unbalancing means in one of said circuits to unbalance said circuits to actuate said motor to move said object member along the other branch and relative to said lens and toward its point to focus said enlarger and to bring said contacts into alignment and into contact with said bar to stop said motor to maintain said members at said points.

14. In a photographic enlarger, the combination with a projection lens and a reflector for reflecting light rays through a path of 90° to provide an optical axis having normally arranged branches, object and image receiving members positioned on different branches and located at the conjugate points of said lens when said enlarger is in focus, said object member and said lens being movable relative to the image receiving member to vary the magnification, the lens moving along one of said branches, of a pair of electrical contacts positioned on said branches and in the planes of said members, another contact positioned intermediate and in alignment with said pair of contacts when said members are at said points and said enlarger is in focus, said other contact being spaced from each branch a distance equal to the focal length of said lens, an electrical motor, means to connect said motor to one of said members to move the latter along its branch toward one of said points, means for connecting said contacts in the circuit of said motor, and a straight bar pivoted at one of said contacts and engaging and electrically connecting said aligned contacts when said enlarger is in focus to stop said motor, but when said enlarger is out of focus said contacts are misaligned so that said bar will engage only one of said two contacts to actuate said motor to move said one member toward one of said points to focus the enlarger and to realign said contacts.

15. In a photographic enlarger, the combination with a projection lens and a reflector for reflecting light rays through a path of 90° to provide an optical axis having normally arranged branches, object and image receiving members positioned on different branches and located at the conjugate points of said lens when said enlarger is in focus, said object member and said lens being movable relative to the image receiving member to vary the magnification, the lens moving along one of said branches, of a pair of electrical contacts positioned on said branches and in the planes of said members, another contact positioned intermediate and in alignment with said pair of contacts when said members are at said points and said enlarger is in focus, said other contact being spaced from each branch a distance equal to the focal length of said lens, an electrical motor, means to connect said motor to one of said members to move the latter along its branch toward one of said points, means for connecting said contacts in the circuit of said motor, and a straight bar pivoted at one of said contacts and engaging and electrically connecting said aligned contacts when said enlarger is in focus to stop said motor, but when said enlarger is out of focus said contacts are misaligned so that said bar will engage only one of said two contacts to actuate said motor to move said one member toward one of said points to focus the enlarger and to realign said contacts, an adjustable mounting for said other contact for adjusting the latter along a line bisecting said branches to adjust said other contact to compensate for lenses of different focal length, and means for clamping the third contact in adjusted position.

16. In a photographic enlarger, the combination with a projection lens and a reflector for reflecting light rays through a bent optical path to provide an optical axis having angularly arranged branches, object and image receiving members positioned on different branches and located at the conjugate points of said lens when said enlarger is in focus, said lens and one of said members being movable along separate paths relative to the other member, an inclined track along which said lens and one of said members are mounted for movement along separate paths and relative to the other member, of a pair of electrical contacts arranged substantially in the plane of said members, another contact positioned intermediate and in alignment with said pair of contacts when said members are at said points and said enlarger is in focus, said other contact being spaced from one of said branches and said track a distance equal to one focal length of said lens, an electrical motor, means to connect said motor to one of said members to move the latter along its branch toward one of said points, means for connecting said contacts in the circuit of said motor, and a straight bar pivoted at one of said contacts and engaging and electrically connecting said aligned contacts when said enlarger is in focus to stop said motor, but when said enlarger is out of focus said contacts are misaligned so that said bar will engage only one of said two contacts to activate said motor to move said one member toward one of said points to focus the enlarger and to realign said contacts.

17. In a photographic enlarger, the combination with a projection lens and a reflector for reflecting light rays through a bent optical path to provide an optical axis having angularly arranged branches, object and image receiving members positioned on different branches and located at the conjugate points of said lens when said enlarger is in focus, said lens and one of said members being movable along separate paths relative to the other member, an inclined track on which said lens and one of said members are mounted for movement along separate paths relative to the other member to vary the magnification, the path of said lens being inclined to both of said branches, of an electrical contact fixed with respect to said image receiving member, a second contact fixed with respect to the object member, a third contact fixed relative to said lens and positioned intermediate said other contacts, said third contact being positioned on a line through said lens at an angle to said branches and said lens path and spaced a distance of one focal length from said lens path measured parallel to the nearer branch of said axis, said contacts being arranged in alignment when said enlarger is in focus and said members are at said points, an electrical motor, means for connecting said motor to said movable member to move the latter along one of said branches and relative to said lens, means for connecting said contacts into the circuit of said motor, a straight bar, and means to pivot said bar on one of said contacts, said bar pivoting on said one contact and movable into engagement with the other two contacts when the contacts are aligned, but when the contacts are out of alignment the bar will engage only one of the other contacts to adjust the circuit of said motor to cause said motor to move said movable member relative to said lens to a conjugate point thereof to bring the enlarger into focus.

18. In a photographic enlarger, the combination with a projection lens and a reflector for reflecting light rays through a bent optical path to provide an optical axis having angularly arranged branches, object and image receiving members positioned on different branches and located at the conjugate points of said lens when said enlarger is in focus, said lens and one of said members being movable along separate paths relative to the other member, an inclined track on which said lens and one of said members are mounted for movement along separate paths relative to the other member to vary the magnification, the path of said lens being inclined to both of said branches, said lens path being inclined at an angle $\alpha$ from one of said branches, of an electrical contact fixed with respect to said image receiving member, a second contact fixed with respect to the object member, a third contact fixed relative to said lens and positioned intermediate said other contacts, said third contact being positioned on a line through said lens and at an angle $\alpha$ such that tangent $\beta = 1 +$ tangent $\alpha$ and spaced from said lens path and said other branch a distance equal to one focal length of said lens, said contacts being arranged in alignment when said enlarger is in focus and said members are at said points, an electrical motor, means for connecting said motor to said movable member to move the latter along one of said branches and relative to said lens, means for connecting said contacts into the circuit of said motor, a straight bar, and means to pivot said bar on one of said contacts, said bar pivoting on said one contact and movable into engagement with the other two contacts when the contacts are aligned, but when the contacts are out of alignment the bar will engage only one of the other contacts to adjust the circuit of said motor to cause said motor to move said movable member relative to said lens to a conjugate point thereof to bring the enlarger into focus.

19. In a photographic enlarger, the combination with a projection lens and a reflector for reflecting light rays through a bent optical path to provide an optical axis having angularly arranged branches, object and image receiving members positioned on different branches and located at the conjugate points of said lens when said enlarger is in focus, said lens and one of said members being movable along separate paths relative to the other member, an inclined track on which said lens and one of said members are mounted for movement along separate paths relative to the other member to vary the magnification, the path of said lens being inclined to both of said branches, of an electrical contact fixed with respect to said image receiving member, a second contact fixed with respect to said object member, a third contact fixed relative to a lens and positioned between said other contacts, said third contact being positioned on a line through said lens arranged at an angle to said branches and the lens path and spaced a distance of one focal length of the lens from said lens path measured parallel to the nearer branch and one focal length from the latter, an electrical motor, means for connecting said motor to said movable member to move the latter along one of said branches and relative to said lens, means for connecting said contacts into the circuit of said motor, a straight bar, means to pivot said bar on one of said contacts, said bar pivoting on said one contact and movable into engagement with the other two contacts when the contacts are aligned, but when the contacts are out of alignment the bar will engage only one of the other contacts to adjust the circuit of said motor to cause said motor to move said movable member relative to said lens to a conjugate point thereof to bring the enlarger into focus, and means to adjust said third contact along said line to compensate for lenses of different focal lengths.

20. In a photographic enlarger, the combination with a projection lens and a reflector for reflecting light through an optical path of 90° to provide an optical axis having normally arranged branches, a track inclined to said branches along which said lens and one of said members are moved relative to the other member to vary the magnification, the path of said lens when moved along said track being at an angle $a$ with respect to one of said branches, of an electrical contact fixed with respect to said image receiving member, a second contact fixed with respect to the object member, a third contact fixed relative to a lens of one focal length and positioned on a line through said lens and at an angle $a$ to said one branch such that tangent $\beta = 1 + \text{tangent } a$ and spaced from said lens path and said other branch a distance of one focal length of the lens, means for adjusting the position of said third contact along said line to compensate for lenses of different focal lengths, said contacts being arranged in alignment when said enlarger is in focus, and said members are at said points, an electrical motor, means to connect said motor to said movable member to move the latter along one of said branches and relative to said lens, means for connecting said contacts into the circuit of said motor, a straight bar, and means to pivot said bar on one of said contacts, said bar pivoting on said one contact and movable into engagement with the other two contacts when the contacts are aligned, but when the contacts are out of alignment the bar will engage only one of the other contacts to adjust the circuit of said motor to cause said motor to move said movable member relative to said lens to a conjugate point thereof to bring the enlarger into focus.

KENNETH G. MACLEISH.

No references cited.